US008080177B2

(12) United States Patent
Long et al.

(10) Patent No.: US 8,080,177 B2
(45) Date of Patent: Dec. 20, 2011

(54) LOW RF LOSS STATIC DISSIPATIVE ADHESIVE

(75) Inventors: Lynn E. Long, Manhattan Beach, CA (US); Randall Jay Moss, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 637 days.

(21) Appl. No.: 12/194,077

(22) Filed: Aug. 19, 2008

(65) Prior Publication Data

US 2010/0043971 A1    Feb. 25, 2010

(51) Int. Cl.
*H01B 1/20* (2006.01)

(52) U.S. Cl. ........................................ 252/500; 156/326

(58) Field of Classification Search .................. 252/500; 156/326

See application file for complete search history.

(56) References Cited

U.S. PATENT DOCUMENTS

| 4,900,387 | A |   | 2/1990  | Johnson              |         |
|-----------|---|---|---------|----------------------|---------|
| 5,160,374 | A |   | 11/1992 | Frederickson et al.  |         |
| 5,445,873 | A |   | 8/1995  | Yaginuma et al.      |         |
| 5,645,764 | A | * | 7/1997  | Angelopoulos et al.  | 252/500 |
| 5,665,274 | A |   | 9/1997  | Long et al.          |         |
| 6,482,521 | B1 |  | 11/2002 | Lee et al.           |         |
| 6,649,888 | B2 |  | 11/2003 | Ryan et al.          |         |
| 7,017,822 | B2 |  | 3/2006  | Aisenbrey            |         |
| 7,238,306 | B2 |  | 7/2007  | Ries                 |         |
| 7,618,559 | B2 | * | 11/2009 | Yoshida et al.       | 252/500 |
| 7,875,210 | B2 | * | 1/2011  | Desvergne-Bleneau et al. | 252/500 |

FOREIGN PATENT DOCUMENTS

EP    0822236 A1    2/1998

OTHER PUBLICATIONS

Pietila et al "Electrically conductive polyaniline adhesive", ADHES '00 Proceedings of the Adhesive Joining and COating Technology in Electronics Manufacturing 2000. Proceedings. 4th International Conference. 2000.*

Jia et al "Electrically conductive composites based on epoxy resin with polyaniline-DBSA fillers", Synthetic Metals 132 (2003) 269-278.*

Padey, D.; Conductive Composite Polymers for Electromagnetic Protection; Jan. 1, 1996; 56 pages.

* cited by examiner

*Primary Examiner* — Mark Kopec
(74) *Attorney, Agent, or Firm* — Armstrong Teasdale LLP

(57) ABSTRACT

The present disclosure is generally directed to electrically conductive adhesives. More particularly, the disclosure is directed to electrically conductive adhesives comprising an organic polymer resin and an electrically conductive polymer. Advantageously, the electrically conductive adhesives have low RF loss, and are thus suitable for use in a space radar antenna and in other antenna applications where antenna components are in the RF field of view.

19 Claims, 2 Drawing Sheets

LOW RF LOSS STATIC DISSIPATIVE ADHESIVE

BACKGROUND

The present disclosure is generally directed to electrically conductive adhesives. More particularly, the disclosure is directed to electrically conductive adhesives comprising an organic polymer resin and an electrically conductive polymer. Advantageously, the electrically conductive adhesives have low RF loss, and are thus suitable for use in a space radar antenna.

Electronic structures used in spacecraft and space radar antenna arrays are susceptible to the accumulation of electronic charge on the surfaces of the electronic structures. The space environment has a flux of energetic electrons from the solar wind and other sources. These electrons may penetrate spacecraft or sunshields and accumulate on the surfaces of the electronic structures as static charges. When the static charges accumulate to the extent that they become sufficiently high in voltage, they may discharge uncontrollably by arcing and cause damage to the electronic structure.

To protect against such uncontrolled discharge events, the conducting surfaces of electronic structures need to be grounded by leads extending to a common ground. Development of a suitable mechanism by which electronic elements of a space radar antenna can be grounded has, however, proven difficult. In particular, a space radar antenna is comprised of many metal radio frequency (RF) radiating elements, also referred to as patches, on lightweight foam tiles. These foam tiles with metal patches are bonded to each other and to a sunshield film for thermal protection. Each of these metal patches must be grounded to the spacecraft structure to avoid uncontrolled electrostatic discharges, which may interfere with the electronic elements of the antenna.

Prior methods to ground the metal patches have involved use of metal pins to separately ground each metal element. Use of metal pins, however, is impractical for use in space radar antenna, as they add complexity to the antenna design and are not practical for use with lightweight foam tiles.

Electrically conductive adhesives have also been used to ground the metal patches. Specifically, electrically conductive adhesives comprising conductive filler such as carbon powder, graphite, or electrically conductive ceramic or metals, have been used to bleed off static charges that build up on the metal patches resulting from exposure to the space environment. However, such electrically conductive adhesives have proven unsatisfactory for use in space radar antenna. Specifically, the solid conductive fillers present in the adhesive absorbing RF signals, resulting in high RF return and insertion loss. As a result, the antenna may not function properly. Additionally, if the electrical conductivity of the adhesive is too high, excessive current may flow between metal patches, leading to degradation in performance of circuits, or in the extreme case, shorting of circuits.

There is thus a need for an improved way to sufficiently ground floating metal patches in space radar antenna without loss of RF performance.

BRIEF DESCRIPTION

In one aspect, the present disclosure is directed to an electrically conductive adhesive comprising an organic polymer resin and an electrically conductive polymer, wherein the electrically conductive adhesive has an electrical resistance of from about $10^4$ ohms to less than $10^9$ ohms.

In another aspect, the present disclosure is directed to an electrically conductive adhesive comprising an organic polymer resin and greater than 4% (by weight of the adhesive) to about 10% (by weight of the adhesive) of an electrically conductive polymer.

In another aspect, the present disclosure is directed to a method of grounding a device using an electrically conductive adhesive. The method comprises providing a device comprising floating metal or electronic components; and electrically connecting the floating metal or electronic components to a grounding point by applying the adhesive to at least a portion of each component; wherein the adhesive comprises an organic polymer resin and an electrically conductive polymer, and has an electrical resistance of from about $10^4$ ohms to less than $10^9$ ohms.

DETAILED DESCRIPTION

Figure 1:
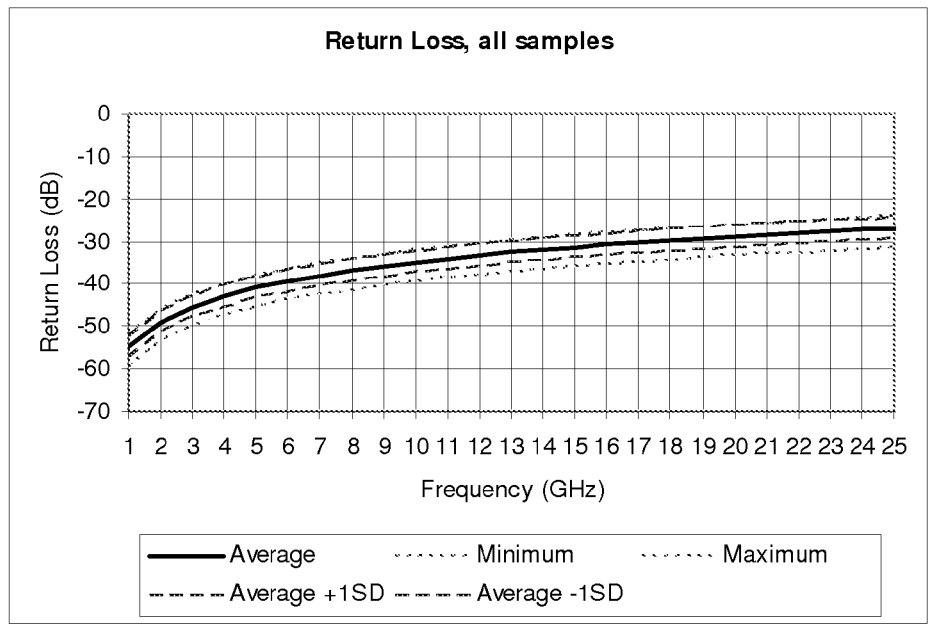
FIG. 1 is a graph depicting the return loss for the electrically conductive adhesives prepared in Example 2. (–) is the average return loss for all adhesives, (~~~) is either the minimum (lower line) or maximum (upper line) return loss measured for the adhesives, and ( - - - ) is either the average return loss plus one standard deviation (upper line) or minus one standard deviation (lower line).

The present disclosure is generally directed to electrically conductive adhesives. More particularly, the disclosure is directed to electrically conductive adhesives comprising an organic polymer resin and an electrically conductive polymer. Advantageously, the electrically conductive adhesives have low RF loss, and are thus suitable for use in a space radar antenna.

As noted above, the electrically conductive adhesive of the present disclosure is a blend of an organic polymer resin and an electrically conductive polymer. The resin provides the adhesive with its bonding properties. The resin may be any polymer material which is suitable for forming an adhesive in the absence of the electrically conductive polymer. A preferred resin is polyurethane, but other suitable resins include, for example, epoxy, silicone, acrylic, polycyanate ester resin, and the like. Combinations of compatible resins may also be used. Advantageously, the resins retain their adhesive functionality even while modified to be conductive. Typically, the electrically conductive adhesive will comprise from about 90% (by weight of the adhesive) to about 98% (by weight of the adhesive) of the organic polymer resin.

The electrically conductive polymer provides electrical conductivity to the adhesive. The electrically conductive polymer may be any polymer material that may be blended with the organic polymer resin and is electrically conductive. A preferred electrically conductive polymer is a polyaniline such as an acid-doped polyaniline. The polyaniline may be doped with any suitable acid known in the art. Examples of suitable doped-polyanilines include, but are not limited to, polyaniline-dodecyl benzene sulfonic acid, sometimes represented as PANI-DBSA, polyaniline-camphor sulfonic acid, polyaniline-dinonylnaphthalene sulfonic acid, polyaniline-hydrochloric acid, polyaniline-sulfuric acid, and the like. Other suitable electrically conductive polymers include, for example, polypyrrole, polythiophene, polyacetylene, polyphenylene sulfide, and the like.

Preferably, the electrically conductive polymer is a polyaniline doped with any suitable acid, such as polyaniline-dodecyl benzene sulfonic acid, polyaniline-hydrochloric acid, polyaniline-sulfuric acid, and the like. The electrically conductive adhesives of the present disclosure may comprise a single type of electrically conductive polymer, or alternately, may comprise combinations of two or more types of different electrically conductive polymers.

The proportions of the organic polymer resin and the electrically conductive polymer in the blend are such that the electrical resistance to ground of the final cured adhesive is from about $10^4$ ohms to less than $10^9$ ohms, and more preferably is from about $10^6$ ohms to about $10^8$ ohms. This resistance is sufficiently low to permit accumulated static electrical charges deposited upon the surface of the electronic or metal structures to be slowly conducted to ground in a carefully controlled discharge, before they can accumulate to such a degree that there is danger of an uncontrolled discharge event, such as an arc or other disruption of electronic components.

Advantageously, the variance in the electrical resistance of the electrically conductive adhesives of the present disclosure is acceptable over a wide range of temperatures. While the electrically conductive adhesives of the present disclosure are more conductive at higher temperatures and less conductive at colder temperatures, this variance is acceptable, since the change remains within the required electrical resistance range. For example, at −40° C., the electrical resistance of the adhesive is approximately one order of magnitude lower than the resistance of the adhesive at room temperature (about 25° C.), and at 100° C., the electrical resistance is approximately 1 order of magnitude higher than the resistance of the adhesive at room temperature. In contrast, adhesives containing particles such as carbon powder, graphite, or ceramic or metal particle fillers are more conductive at colder temperatures, as the adhesive shrinks and particles become closer together, and less conductive at higher temperatures as the adhesive expands, and the particles move farther apart.

Preferably, the electrically conductive adhesive will comprise from about 2.0% (by weight of the adhesive) to about 10% (by weight of the adhesive), and more preferably about 2.5% (by weight of the adhesive) to about 6% (by weight of the adhesive) of the electrically conductive polymer. In one embodiment, the electrically conductive adhesive comprises greater than 4% (by weight of the adhesive) to about 10% (by weight of the adhesive), or more preferably greater than 4% (by weight of the adhesive) to about 6% (by weight of the adhesive) of the electrically conductive polymer.

In some instances, the electrical resistance of the electrically conductive adhesive may be selectively established by the percentage of the electrically conductive polymer in the adhesive. For instance, if the polymer is properly dispersed to a small particle size, increasing amounts of the electrically conductive polymer lead to lower electrical resistance of the adhesive. A calibration may be prepared of the relation between electrical resistance and percentage of electrically conductive polymer, from which the required percentage to achieve a desired electrical resistance may be found. Adhesives with varying electrical resistance may be used in specific applications and operating environments, and may even be used on different parts of the same structure.

Additionally, as noted above, the electrically conductive polymers of the present disclosure advantageously have good RF performance. More particularly, there is very little RF loss when the adhesives of the present disclosure are used, as compared to electrically conductive adhesives that comprise carbon powder, graphite, or ceramic or metal particle fillers. Without wishing to be bound to any particular theory, it is believed that the electrically conductive polymers do not absorb RF signals like carbon powder, graphite, or ceramic or metal particle fillers do. Rather, the electrically conductive polymers allow RF signals to pass through with little absorption. As a result, the conductive polymers have lower RF loss than traditionally used carbon powder, graphite, or ceramic or metal particle fillers.

The return loss and insertion loss of the electrically conductive adhesives of the present disclosure will vary depending on the frequency at which they are measured. Preferably, however, at a frequency of from about 6 GHz to about 12 GHz, the electrically conductive adhesives will have a return loss of −30 dB or lower, and an insertion loss of about 0.01 dB or lower. Additionally, the electrically conductive adhesives advantageously have a dielectric constant of about 3.0 or less, and preferably of about 2.5 or less, and a loss tangent of about 0.05 or less, and preferably of about 0.03 or less. The adhesives of the present disclosure may have low to high modulus, and thus may be either soft or hard upon curing.

The degree of conductance of the electrically conductive adhesive may be controlled by the amount of electrically conductive polymer present in the adhesive. Typically, however, the electrically conductive adhesive will have an electrical conductance of from about 1 megohms ($10^6$ ohms) to about 100 megohms ($10^8$ ohms).

As electronic charge is deposited onto electronic or metal components of the space radar antenna, the charge is slowly conducted to ground through the electrically conductive adhesive. This draining or trickling of the static charge to ground prevents voltages from building up on the electronic or metal components, which might otherwise become large and cause arcs or other damage to surrounding electronics. Stated another way, the electrically conductive adhesive provides a controlled, gradual discharge of the static charge, preventing an uncontrolled discharge in the form of an arc that might damage the electrical components.

Thus, in another embodiment, the present disclosure is directed to a method of grounding a device using an electrically conductive adhesive. The method comprises providing a device comprising floating metal or electronic components; and electrically connecting the floating metal or electronic components to a grounding point by applying an electrically conductive adhesive to at least a portion of each component. The electrically conductive adhesive may be any electrically conductive adhesive described herein, and is preferably applied so that the floating metal or electronic components of the device are connected to the grounding point by way of the adhesive. As used herein, the term "floating metal or electronic components" refers to metal or electronic components of a device which are not electrically connected to a grounding point. For example, floating metal components may be metal patches present on a space radar antenna, such as described herein. The grounding point may be any location or structure suitable to ground the floating metal or electronic components and in some instances may be, for example, the base of the device itself. In one particular embodiment, the device is a space radar antenna. Other examples of suitable devices include any device containing RF producing elements, or which requires grounding of device components.

The electrically conductive adhesives are typically prepared by blending, by any suitable mechanism, the electrically conductive polymer into a solvent, such as toluene, xylene, chloroform, 1-methylpyrrolidone (NMP), dichloromethane, and the like, using a high shear mixing device. Preferably, the solvent is toluene. The electrically conductive polymer may be in any suitable form, including for example, a powder or a fine dispersion in solvent, or the like. The desired amount of the electrically conductive polymer/solvent solution is then added to uncured organic polymer resin and mixed well by vigorous shaking or stirring. In some embodiments, after the polymer powder or polymer solution is mixed into the adhesive resin, the adhesive can optionally be made into a film or frozen premix by adding the curing agent for the resin, packaging into a container, and quickly freezing.

Following mixing of the electrically conductive polymer/solvent solution and the uncured organic polymer resin, the solvent is advantageously removed from the resulting polymer/resin blend. Without wishing to be bound to any particular theory, it is believed that the presence of solvent in the blend may interfere with the curing process. Thus, by removing solvent from the polymer/resin blend, the electrically conductive adhesive formed upon curing will have improved bonding properties.

The solvent may be removed by any suitable mechanism. In one preferred embodiment, the solvent is removed using rotary evaporation. Preferably, upon curing, the electrically conductive adhesives of the present disclosure will comprise about 2% (by weight of the adhesive) or less of solvent, and more preferably will comprise no solvent (i.e., 0% (by weight of the adhesive) of solvent). Stated another way, upon curing, the electrically conductive adhesives of the present disclosure will advantageously have a solids content of at least about 98% (by weight of the adhesive), and more preferably will have a solids content of 100% (by weight of the adhesive).

After the solvent is removed, the polymer/resin blend is applied to the structure(s) to be adhered in amounts suitable to provide the desired level of adherence. Prior to curing, the blend is typically either a very viscous liquid or thick paste, for example, having a viscosity of at least about 2,000 centipoise. In this embodiment, the application of the polymer/resin blend to the structure to be adhered is by any operable technique for such a viscous liquid or paste, such as brushing, screen printing, flow coating, film layup, spray application, and the like. Preferably, the polymer/resin blend is applied in amounts sufficient to result in a bondline thickness of from 0.002 inches to 0.005 inches. Alternately, the blend is in the form of a thin film, typically having a thickness of from about 0.002 inches to about 0.005 inches. In this embodiment, the film is applied to the structure to be adhered. In some embodiments, the film may be partially cured prior to application.

Once applied, the adhesive is cured. The curing is preferably accomplished according to the procedure recommended for the organic polymer resin. Because the proportion of the electrically conductive polymer is so small, its presence has little effect on the curing of the blend. The curing is therefore dominated by the curing processes of the organic polymer resin. In one embodiment, the adhesive is cured at room temperature overnight. Alternately, the curing may occur at elevated temperatures for several hours. The bond strength of the adhesive after curing may be from about 100 psi tensile lap shear strength to about 5,000 psi tensile lap shear strength.

The electrically conductive adhesives of the present disclosure can be used to in space radar antenna to, for example, ground floating electronic components or metal parts, to bond foam tile components together, and/or to bond a sunshield to a foam tile assembly, without loss of RF performance. Other applications, such as the grounding of floating metal parts and overcoating plastic parts on the structure of a satellite, even in instances where RF loss is not an issue, would also benefit from this technology.

Having described the disclosure in detail, it will be apparent that modifications and variations are possible without departing from the scope of the disclosure defined in the appended claims.

EXAMPLES

The following non-limiting examples are provided to further illustrate the present disclosure.

Example 1

In this example, the electrical resistance of various electrically conductive adhesives was determined.

To begin, electrically conductive adhesives were prepared by mixing various concentrations of the electrically conductive polymer polyaniline/dodecylbenzene sulfonic acid (PANI/DBSA) into toluene solvent, under high shear. The polymer/solvent mixtures were then mixed with various organic polymer resins using hand stirring. The solvent was removed from the resulting polymer/resin blends using a rotary evaporation device, Yamato Model RE 540 Evaporator with Condenser. The resulting polymer/resin blends contained no solvent. The specific resins and amounts of electrically conductive polymer used to prepare the blends are set forth in Table 1 below.

Each blend was brushed onto a comb pattern test circuit. The polymer/resin blend was then cured for 3 to 4 hours in an oven at 65° C. (150° F.) to form electrically conductive adhesives. Following curing, electrical resistance of the adhesives was measured with an ohmmeter. The results are shown in Table 1.

TABLE 1

| Organic polymer resin (no solvent) | % PANI/DBSA | Comb pattern resistance (ohms) |
|---|---|---|
| Epoxy (Aptex) | 6.0% | $1.0 \times 10^7$ |
| Epoxy (Aptex) | 6.0% | $1.0 \times 10^7$ |
| Epoxy (Aptex) | 6.0% (fine dispersion) | $1.0 \times 10^7$ |
| Epoxy (Aptex) | 6.0% (fine dispersion) | $1.0 \times 10^7$ |
| Epoxy (Aptex) | 2.5% | $3.0 \times 10^6$ |
| Epoxy (Aptex) | 2.5% | $3.0 \times 10^6$ |
| Aptex 2100 polyurethane | 1.2% | $1.0 \times 10^9$ |
| Aptex 2100 polyurethane | 2.5% | $2.0 \times 10^6$ |
| Aptex 2100 polyurethane | 2.5% | $2.0 \times 10^6$ |
| Epoxy (Aptex) | 2.5% (frozen premix) | $5.0 \times 10^6$ |

As can be seen from these results, the electrically conductive adhesives all had good resistance measurements. The resistance decrease from $1.0 \times 10^7$ ohms to $3.0 \times 10^6$ ohms when the amount of PANI/DBSA was decreased from 6.0% to 2.5% for the epoxy resin samples is believed to be the result of better dispersion (smaller particle size) of the electrically conductive polymer in the samples containing 2.5% PANI/DBSA, as compared to the samples containing 6.0% PANI/DBSA. Without wishing to be bound to any particular theory, it is believed that better dispersion of the electrically conductive polymer in the adhesive results in lower adhesive resistance. Thus, the optimum electrostatic discharge (ESD) (resistance to ground) performance achieved in this example was achieved at a 2.5% amount of PANI/DBSA when the polymer was dispersed properly (i.e., small particle size).

Additionally, the resistance increased from $3.0 \times 10^6$ ohms to $5.0 \times 10^6$ ohms when the 2.5% PANI/DBSA frozen premix was used, as compared to the sample comprising 2.5% PANI/DBSA which was not a frozen premix. As noted above, frozen premix contains curing agent that has been added to the premix prior to freezing. Without wishing to be bound to any particular theory, it is believed that as the time between adding a curing agent to the resin and the time of applying (bonding) the adhesive increases, the resistance of the resulting adhesive also increases. Thus, for adhesives prepared using the frozen premix, the resistance is higher because extra time is required to freeze and thaw the premix before adhesive application.

Example 2

In this example, the return loss and insertion loss for various electrically conductive adhesives was measured.

To begin electrically conductive adhesives were prepared as described in Example 1. The specific resins and amounts of electrically conductive polymer used to prepare each adhesive are set forth in Table 2 below. The particle size range for dispersions (in millimeters) is also give. Two controls containing epoxy resins but no conductive polymer were also tested.

TABLE 2

| Sample Number | Organic polymer resin (no solvent) | % PANI/DBSA | Dielectric constant | Loss Tangent |
|---|---|---|---|---|
| 1 | Epoxy | 6.0% | 2.88 | 0.0266 |
| 2 | Epoxy | 6.0% | 2.86 | 0.0370 |
| 3 | Epoxy | 6.0% | 2.69 | 0.0317 |
| 4 | Epoxy | 6.0% | 2.69 | 0.0311 |
| 5 | Epoxy | 6.0% (0.0035-0.0042 fine dispersion) | 2.83 | 0.0469 |
| 6 | Epoxy | 6.0% (0.0035-0.0042 fine dispersion) | 2.80 | 0.0460 |
| 7 | Epoxy | 6.0% (0.004-0.005 fine dispersion) | 3.12 | 0.0613 |
| 8 | Epoxy | 6.0% (0.004-0.005 fine dispersion) | 3.05 | 0.0509 |
| 9 | Epoxy | 6.0% (0.004-0.005 fine dispersion) | 2.89 | 0.0591 |
| 10 | Epoxy | 6.0% (0.004-0.005 fine dispersion) | 2.83 | 0.0490 |
| 11 | Epoxy (Aptex) | 2.5% (2.7-3.2 dispersion) | 2.33 | 0.0291 |
| 12 | Epoxy (Aptex) | 2.5% (2.7-3.2 dispersion) | 2.33 | 0.0290 |
| 13 | Epoxy (Aptex) | 2.5% (4.3-4.7 dispersion) | 2.56 | 0.0271 |
| 14 | Epoxy (Aptex) | 2.5% (4.3-4.7 dispersion) | 2.55 | 0.0270 |
| 15 | Aptex 2100 polyurethane | 2.5% | 2.43 | 0.0437 |
| 16 | Aptex 2100 polyurethane | 2.5% | 2.43 | 0.0435 |
| 17 | Aptex 2100 polyurethane | 2.5% | 2.49 | 0.0392 |
| 18 | Aptex 2100 polyurethane | 2.5% | 2.49 | 0.0397 |
| 19 | Epoxy control | — | 2.63 | 0.0275 |
| 20 | Epoxy control | — | 2.60 | 0.0281 |

Figure 2:
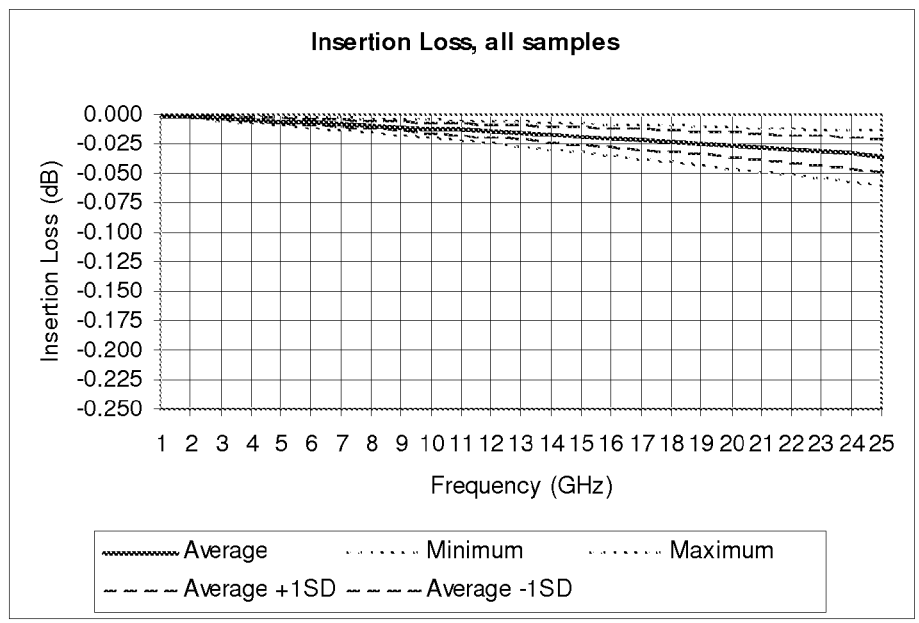
FIG. 2 is a graph depicting the insertion loss for the electrically conductive adhesives prepared in Example 2. (–) is the average insertion loss for all adhesives, (~~~) is either the minimum (lower line) or maximum (upper line) insertion loss measured for the adhesives, and ( - - - ) is either the average insertion loss plus one standard deviation (upper line) or minus one standard deviation (lower line).

The return loss and insertion loss for each of the electrically conductive adhesives and the two epoxy controls was measured using a Damascus Wave Resonator. The results of these measurements are shown in FIGS. 1 and 2 and in Tables 3 and 4 below. Specifically, FIG. 1 shows the average return loss and FIG. 2 shows the average insertion loss for all of the electrically conductive adhesives listed in Table 2, over frequencies ranging from 1 to 25 GHz. While the acceptable return and insertion loss measurements will vary depending on the frequency at which the return and insertion loss are measured, for frequencies of 6 GHz to 12 GHz, a return loss of −30 dB or lower and an insertion loss of 0.01 dB or lower is desirable. As can be seen from FIGS. 1 and 2, the electrically conductive adhesives had acceptable levels of return and insertion loss at these frequencies. Tables 3 and 4 show the return loss (dB) and insertion loss (dB), respectively, for each of the adhesives listed in Table 2, over frequencies ranging from 1 to 50 GHz.

Figure 3:
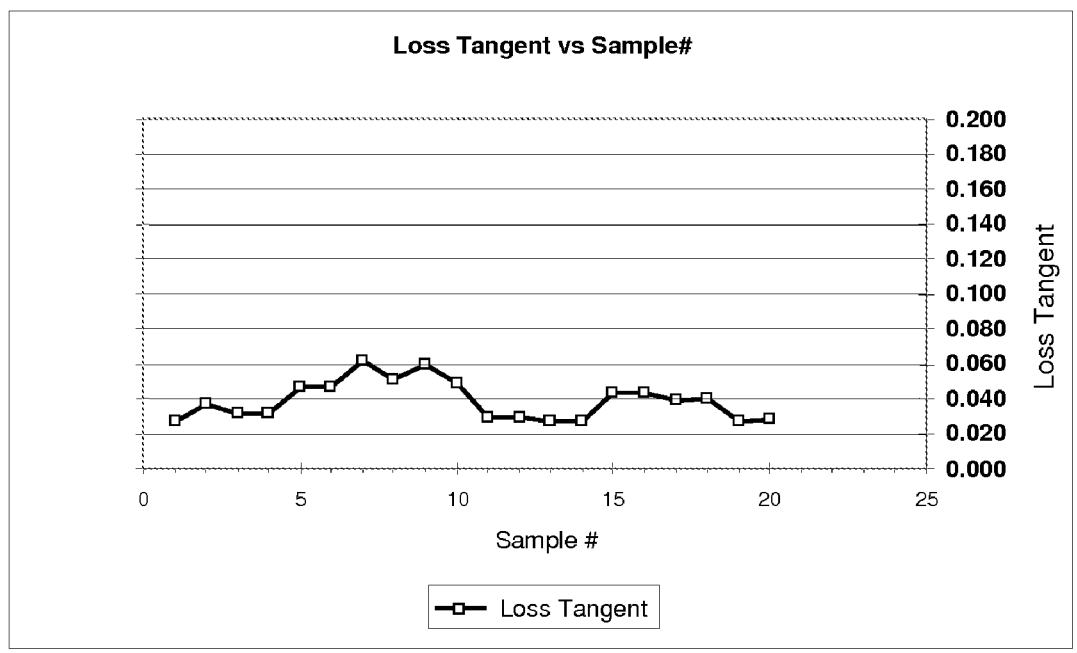
FIG. 3 is a graph depicting the loss tangent for the electrically conductive adhesives and controls prepared in Example 2.

The loss tangent and dielectric constant for each sample was also determined, and these results are shown in FIG. 3 (loss tangent) and in Table 2 above. As can be seen from these results, the optimum RF performance (low loss) is achieved at a 2.5% amount of PANI/DBSA when the polymer is dispersed properly (i.e., small particle size).

TABLE 3

Return Loss (dB)

| | Frequency (GHz) | | | | | | | | | | | | | | | | |
|---|---|---|---|---|---|---|---|---|---|---|---|---|---|---|---|---|---|
| Sample No. | 1.0 | 2.0 | 3.0 | 4.0 | 5.0 | 6.0 | 7.0 | 8.0 | 9.0 | 10.0 | 11.0 | 12.0 | 13.0 | 14.0 | 15.0 | 16.0 | 17.0 |
| 1 | −56.5 | −50.5 | −46.9 | −44.4 | −42.5 | −40.9 | −39.6 | −38.4 | −37.4 | −36.5 | −35.7 | −34.9 | −34.2 | −33.6 | −33.0 | −32.4 | −31.9 |
| 2 | −56.6 | −50.6 | −47.0 | −44.5 | −42.6 | −41.0 | −39.7 | −38.5 | −37.5 | −36.6 | −35.8 | −35.0 | −34.3 | −33.7 | −33.1 | −32.5 | −32.0 |
| 3 | −52.1 | −46.1 | −42.6 | −40.1 | −38.1 | −36.6 | −35.2 | −34.1 | −33.0 | −32.1 | −31.3 | −30.5 | −29.9 | −29.2 | −28.6 | −28.1 | −27.5 |
| 4 | −52.1 | −46.1 | −42.6 | −40.1 | −38.2 | −36.6 | −35.2 | −34.1 | −33.1 | −32.1 | −31.3 | −30.6 | −29.9 | −29.2 | −28.6 | −28.1 | −27.6 |
| 5 | −54.2 | −48.2 | −44.7 | −42.2 | −40.2 | −38.7 | −37.3 | −36.2 | −35.1 | −34.2 | −33.4 | −32.6 | −32.0 | −31.3 | −30.7 | −30.2 | −29.6 |
| 6 | −54.3 | −48.3 | −44.8 | −42.3 | −40.3 | −38.8 | −37.4 | −36.3 | −35.2 | −34.3 | −33.5 | −32.8 | −32.1 | −31.4 | −30.8 | −30.3 | −29.7 |
| 7 | −52.5 | −46.5 | −43.0 | −40.5 | −38.5 | −36.9 | −35.6 | −34.4 | −33.4 | −32.5 | −31.7 | −30.9 | −30.2 | −29.6 | −29.0 | −28.4 | −27.9 |
| 8 | −52.8 | −46.8 | −43.2 | −40.7 | −38.8 | −37.2 | −35.9 | −34.7 | −33.7 | −32.8 | −32.0 | −31.2 | −30.5 | −29.9 | −29.3 | −28.7 | −28.2 |
| 9 | −52.5 | −46.5 | −43.0 | −40.5 | −38.5 | −36.9 | −35.6 | −34.5 | −33.4 | −32.5 | −31.7 | −30.9 | −30.3 | −29.6 | −29.0 | −28.5 | −27.9 |
| 10 | −52.8 | −46.8 | −43.2 | −40.7 | −38.8 | −37.2 | −35.9 | −34.7 | −33.7 | −32.8 | −32.0 | −31.2 | −30.5 | −29.9 | −29.3 | −28.7 | −28.2 |
| 11 | −59.5 | −53.4 | −49.9 | −47.4 | −45.5 | −43.9 | −42.5 | −41.4 | −40.4 | −39.5 | −38.6 | −37.9 | −37.2 | −36.5 | −35.9 | −35.4 | −34.9 |
| 12 | −59.4 | −53.4 | −49.9 | −47.4 | −45.5 | −43.9 | −42.5 | −41.4 | −40.4 | −39.4 | −38.6 | −37.9 | −37.2 | −36.5 | −35.9 | −35.4 | −34.8 |
| 13 | −54.6 | −48.6 | −45.0 | −42.5 | −40.6 | −39.0 | −37.7 | −36.5 | −35.5 | −34.6 | −33.8 | −33.0 | −32.3 | −31.7 | −31.1 | −30.5 | −30.0 |
| 14 | −54.6 | −48.6 | −45.1 | −42.6 | −40.6 | −39.0 | −37.7 | −36.5 | −35.5 | −34.6 | −33.8 | −33.0 | −32.3 | −31.7 | −31.1 | −30.5 | −30.0 |
| 15 | −58.8 | −52.8 | −49.3 | −46.8 | −44.9 | −43.3 | −41.9 | −40.8 | −39.8 | −38.8 | −38.0 | −37.3 | −36.6 | −35.9 | −35.3 | −34.8 | −34.2 |
| 16 | −58.8 | −52.8 | −49.3 | −46.8 | −44.8 | −43.2 | −41.9 | −40.7 | −39.7 | −38.8 | −38.0 | −37.2 | −36.5 | −35.9 | −35.3 | −34.7 | −34.2 |

TABLE 3-continued

Return Loss (dB)

| Sample No. | | | | | | | | | | | | | | | | |
|---|---|---|---|---|---|---|---|---|---|---|---|---|---|---|---|---|
| 17 | −54.1 | −48.0 | −44.5 | −42.0 | −40.1 | −38.5 | −37.2 | −36.0 | −35.0 | −34.1 | −33.2 | −32.5 | −31.8 | −31.2 | −30.6 | −30.0 | −29.5 |
| 18 | −54.0 | −48.0 | −44.5 | −42.0 | −40.1 | −38.5 | −37.1 | −36.0 | −35.0 | −34.1 | −33.2 | −32.5 | −31.8 | −31.1 | −30.5 | −30.0 | −29.4 |
| 19 | −53.3 | −47.3 | −43.7 | −41.2 | −39.3 | −37.7 | −36.4 | −35.2 | −34.2 | −33.3 | −32.5 | −31.7 | −31.0 | −30.4 | −29.8 | −29.2 | −28.7 |
| 20 | −53.4 | −47.4 | −43.9 | −41.4 | −39.5 | −37.9 | −36.5 | −35.4 | −34.4 | −33.5 | −32.6 | −31.9 | −31.2 | −30.5 | −29.9 | −29.4 | −28.9 |

| Sample No. | Frequency (GHz) | | | | | | | | | | | | | | | | |
|---|---|---|---|---|---|---|---|---|---|---|---|---|---|---|---|---|---|
| | 18.0 | 19.0 | 20.0 | 21.0 | 22.0 | 23.0 | 24.0 | 25.0 | 26.0 | 27.0 | 28.0 | 29.0 | 30.0 | 31.0 | 32.0 | 33.0 | 34.0 |
| 1 | −31.4 | −30.9 | −30.5 | −30.1 | −29.6 | −29.3 | −28.9 | −28.5 | −28.2 | −27.9 | −27.6 | −27.3 | −27.0 | −26.7 | −26.4 | −26.1 | −25.9 |
| 2 | −31.5 | −31.0 | −30.6 | −30.2 | −29.8 | −29.4 | −29.0 | −28.6 | −28.3 | −28.0 | −27.7 | −27.4 | −27.1 | −26.8 | −26.5 | −26.3 | −26.0 |
| 3 | −27.0 | −26.6 | −26.1 | −25.7 | −25.3 | −24.9 | −24.6 | −24.2 | −23.9 | −23.6 | −23.2 | −22.9 | −22.7 | −22.4 | −22.1 | −21.8 | −21.6 |
| 4 | −27.1 | −26.6 | −26.2 | −25.7 | −25.3 | −25.0 | −24.6 | −24.2 | −23.9 | −23.6 | −23.3 | −23.0 | −22.7 | −22.4 | −22.1 | −21.9 | −21.6 |
| 5 | −29.1 | −28.7 | −28.2 | −27.8 | −27.4 | −27.0 | −26.7 | −26.3 | −26.0 | −25.6 | −25.3 | −25.0 | −24.7 | −24.5 | −24.2 | −23.9 | −23.7 |
| 6 | −29.2 | −28.8 | −28.3 | −27.9 | −27.5 | −27.1 | −26.8 | −26.4 | −26.1 | −25.7 | −25.4 | −25.1 | −24.8 | −24.6 | −24.3 | −24.0 | −23.8 |
| 7 | −27.4 | −27.0 | −26.5 | −26.1 | −25.7 | −25.3 | −25.0 | −24.6 | −24.3 | −23.9 | −23.6 | −23.3 | −23.0 | −22.8 | −22.5 | −22.2 | −22.0 |
| 8 | −27.7 | −27.2 | −26.8 | −26.4 | −26.0 | −25.6 | −25.2 | −24.9 | −24.5 | −24.2 | −23.9 | −23.6 | −23.3 | −23.0 | −22.8 | −22.5 | −22.2 |
| 9 | −27.4 | −27.0 | −26.5 | −26.1 | −25.7 | −25.3 | −25.0 | −24.6 | −24.3 | −24.0 | −23.6 | −23.3 | −23.1 | −22.8 | −22.5 | −22.2 | −22.0 |
| 10 | −27.7 | −27.3 | −26.8 | −26.4 | −26.0 | −25.6 | −25.2 | −24.9 | −24.6 | −24.2 | −23.9 | −23.6 | −23.3 | −23.0 | −22.8 | −22.5 | −22.3 |
| 11 | −34.4 | −33.9 | −33.4 | −33.0 | −32.6 | −32.2 | −31.9 | −31.5 | −31.2 | −30.8 | −30.5 | −30.2 | −29.9 | −29.7 | −29.4 | −29.1 | −28.9 |
| 12 | −34.3 | −33.9 | −33.4 | −33.0 | −32.6 | −32.2 | −31.9 | −31.5 | −31.2 | −30.8 | −30.5 | −30.2 | −29.9 | −29.6 | −29.4 | −29.1 | −28.8 |
| 13 | −29.5 | −29.0 | −28.6 | −28.2 | −27.8 | −27.4 | −27.0 | −26.7 | −26.3 | −26.0 | −25.7 | −25.4 | −25.1 | −24.8 | −24.5 | −24.3 | −24.0 |
| 14 | −29.5 | −29.0 | −28.6 | −28.2 | −27.8 | −27.4 | −27.0 | −26.7 | −26.3 | −26.0 | −25.7 | −25.4 | −25.1 | −24.8 | −24.6 | −24.3 | −24.0 |
| 15 | −33.7 | −33.3 | −32.8 | −32.4 | −32.0 | −31.6 | −31.3 | −30.9 | −30.6 | −30.2 | −29.9 | −29.6 | −29.3 | −29.0 | −28.8 | −28.5 | −28.2 |
| 16 | −33.7 | −33.2 | −32.8 | −32.4 | −32.0 | −31.6 | −31.2 | −30.9 | −30.5 | −30.2 | −29.9 | −29.6 | −29.3 | −29.0 | −28.7 | −28.5 | −28.2 |
| 17 | −29.0 | −28.5 | −28.1 | −27.7 | −27.3 | −26.9 | −26.5 | −26.1 | −25.8 | −25.5 | −25.2 | −24.9 | −24.6 | −24.3 | −24.0 | −23.8 | −23.5 |
| 18 | −29.0 | −28.5 | −28.0 | −27.6 | −27.2 | −26.8 | −26.5 | −26.1 | −25.8 | −25.5 | −25.1 | −24.8 | −24.6 | −24.3 | −24.0 | −23.7 | −23.5 |
| 19 | −28.2 | −27.7 | −27.3 | −26.9 | −26.5 | −26.1 | −25.7 | −25.4 | −25.0 | −24.7 | −24.4 | −24.1 | −23.8 | −23.5 | −23.3 | −23.0 | −22.7 |
| 20 | −28.4 | −27.9 | −27.5 | −27.0 | −26.6 | −26.3 | −25.9 | −25.5 | −25.2 | −24.9 | −24.6 | −24.3 | −24.0 | −23.7 | −23.4 | −23.1 | −22.9 |

| Sample No. | Frequency (GHz) | | | | | | | | | | | | | | | |
|---|---|---|---|---|---|---|---|---|---|---|---|---|---|---|---|---|
| | 35.0 | 36.0 | 37.0 | 38.0 | 39.0 | 40.0 | 41.0 | 42.0 | 43.0 | 44.0 | 45.0 | 46.0 | 47.0 | 48.0 | 49.0 | 50.0 |
| 1 | −25.6 | −25.4 | −25.2 | −24.9 | −24.7 | −24.5 | −24.3 | −24.1 | −23.9 | −23.7 | −23.5 | −23.3 | −23.1 | −22.9 | −22.7 | −22.6 |
| 2 | −25.7 | −25.5 | −25.3 | −25.0 | −24.8 | −24.6 | −24.4 | −24.2 | −24.0 | −23.8 | −23.6 | −23.4 | −23.2 | −23.0 | −22.9 | −22.7 |
| 3 | −21.3 | −21.1 | −20.9 | −20.6 | −20.4 | −20.2 | −20.0 | −19.8 | −19.6 | −19.4 | −19.2 | −19.0 | −18.8 | −18.7 | −18.5 | −18.3 |
| 4 | −21.4 | −21.1 | −20.9 | −20.7 | −20.4 | −20.2 | −20.0 | −19.8 | −19.6 | −19.4 | −19.2 | −19.0 | −18.9 | −18.7 | −18.5 | −18.4 |
| 5 | −23.4 | −23.2 | −22.9 | −22.7 | −22.5 | −22.3 | −22.1 | −21.9 | −21.7 | −21.5 | −21.3 | −21.1 | −20.9 | −20.7 | −20.5 | −20.4 |
| 6 | −23.5 | −23.3 | −23.0 | −22.8 | −22.6 | −22.4 | −22.2 | −22.0 | −21.8 | −21.6 | −21.4 | −21.2 | −21.0 | −20.8 | −20.7 | −20.5 |
| 7 | −21.7 | −21.5 | −21.3 | −21.0 | −20.8 | −20.6 | −20.4 | −20.2 | −20.0 | −19.8 | −19.6 | −19.4 | −19.2 | −19.1 | −18.9 | −18.7 |
| 8 | −22.0 | −21.8 | −21.5 | −21.3 | −21.1 | −20.9 | −20.7 | −20.4 | −20.3 | −20.1 | −19.9 | −19.7 | −19.5 | −19.3 | −19.1 | −19.0 |
| 9 | −21.7 | −21.5 | −21.3 | −21.0 | −20.8 | −20.6 | −20.4 | −20.2 | −20.0 | −19.8 | −19.6 | −19.4 | −19.3 | −19.1 | −18.9 | −18.7 |
| 10 | −22.0 | −21.8 | −21.5 | −21.3 | −21.1 | −20.9 | −20.7 | −20.5 | −20.3 | −20.1 | −19.9 | −19.7 | −19.5 | −19.3 | −19.2 | −19.0 |
| 11 | −28.6 | −28.4 | −28.1 | −27.9 | −27.7 | −27.5 | −27.2 | −27.0 | −26.8 | −26.6 | −26.4 | −26.2 | −26.1 | −25.9 | −25.7 | −25.5 |
| 12 | −28.6 | −28.3 | −28.1 | −27.9 | −27.7 | −27.4 | −27.2 | −27.0 | −26.8 | −26.6 | −26.4 | −26.2 | −26.0 | −25.9 | −25.7 | −25.5 |
| 13 | −23.8 | −23.5 | −23.3 | −23.1 | −22.8 | −22.6 | −22.4 | −22.2 | −22.0 | −21.8 | −21.6 | −21.4 | −21.2 | −21.1 | −20.9 | −20.7 |
| 14 | −23.8 | −23.5 | −23.3 | −23.1 | −22.9 | −22.6 | −22.4 | −22.2 | −22.0 | −21.8 | −21.6 | −21.4 | −21.3 | −21.1 | −20.9 | −20.7 |
| 15 | −28.0 | −27.8 | −27.5 | −27.3 | −27.1 | −26.8 | −26.6 | −26.4 | −26.2 | −26.0 | −25.8 | −25.6 | −25.5 | −25.3 | −25.1 | −24.9 |
| 16 | −28.0 | −27.7 | −27.5 | −27.3 | −27.0 | −26.8 | −26.6 | −26.4 | −26.2 | −26.0 | −25.8 | −25.6 | −25.4 | −25.2 | −25.1 | −24.9 |
| 17 | −23.3 | −23.0 | −22.8 | −22.6 | −22.3 | −22.1 | −21.9 | −21.7 | −21.5 | −21.3 | −21.1 | −20.9 | −20.8 | −20.6 | −20.4 | −20.2 |
| 18 | −23.2 | −23.0 | −22.8 | −22.5 | −22.3 | −22.1 | −21.9 | −21.7 | −21.5 | −21.3 | −21.1 | −20.9 | −20.7 | −20.6 | −20.4 | −20.2 |
| 19 | −22.5 | −22.2 | −22.0 | −21.8 | −21.6 | −21.4 | −21.1 | −20.9 | −20.7 | −20.5 | −20.4 | −20.2 | −20.0 | −19.8 | −19.6 | −19.5 |
| 20 | −22.6 | −22.4 | −22.2 | −21.9 | −21.7 | −21.5 | −21.3 | −21.1 | −20.9 | −20.7 | −20.5 | −20.3 | −20.1 | −20.0 | −19.8 | −19.6 |

TABLE 4

Insertion Loss (dB)

| Sample No. | Frequency (GHz) | | | | | | | | | | | | |
|---|---|---|---|---|---|---|---|---|---|---|---|---|---|
| | 1.0 | 2.0 | 3.0 | 4.0 | 5.0 | 6.0 | 7.0 | 8.0 | 9.0 | 10.0 | 11.0 | 12.0 | 13.0 |
| 1 | −0.001 | −0.001 | −0.002 | −0.002 | −0.003 | −0.004 | −0.004 | −0.005 | −0.006 | −0.006 | −0.007 | −0.008 | −0.009 |
| 2 | −0.001 | −0.002 | −0.002 | −0.003 | −0.004 | −0.005 | −0.006 | −0.006 | −0.007 | −0.008 | −0.009 | −0.010 | −0.011 |
| 3 | −0.001 | −0.002 | −0.003 | −0.005 | −0.006 | −0.007 | −0.009 | −0.010 | −0.012 | −0.013 | −0.015 | −0.017 | −0.019 |
| 4 | −0.001 | −0.002 | −0.003 | −0.005 | −0.006 | −0.007 | −0.009 | −0.010 | −0.012 | −0.013 | −0.015 | −0.017 | −0.018 |
| 5 | −0.001 | −0.003 | −0.004 | −0.005 | −0.007 | −0.008 | −0.009 | −0.011 | −0.012 | −0.014 | −0.015 | −0.017 | −0.019 |
| 6 | −0.001 | −0.002 | −0.004 | −0.005 | −0.006 | −0.008 | −0.009 | −0.011 | −0.012 | −0.013 | −0.015 | −0.017 | −0.018 |
| 7 | −0.002 | −0.004 | −0.006 | −0.008 | −0.010 | −0.012 | −0.014 | −0.016 | −0.019 | −0.021 | −0.023 | −0.026 | −0.028 |
| 8 | −0.002 | −0.003 | −0.005 | −0.006 | −0.008 | −0.010 | −0.012 | −0.013 | −0.015 | −0.017 | −0.019 | −0.021 | −0.023 |
| 9 | −0.002 | −0.004 | −0.006 | −0.008 | −0.010 | −0.012 | −0.014 | −0.016 | −0.019 | −0.021 | −0.023 | −0.026 | −0.028 |
| 10 | −0.002 | −0.003 | −0.005 | −0.006 | −0.008 | −0.010 | −0.012 | −0.013 | −0.015 | −0.017 | −0.019 | −0.021 | −0.023 |
| 11 | 0.000 | −0.001 | −0.001 | −0.002 | −0.002 | −0.003 | −0.004 | −0.004 | −0.005 | −0.005 | −0.006 | −0.006 | −0.007 |
| 12 | 0.000 | −0.001 | −0.001 | −0.002 | −0.002 | −0.003 | −0.004 | −0.004 | −0.005 | −0.005 | −0.006 | −0.006 | −0.007 |

TABLE 4-continued

Insertion Loss (dB)

| | | | | | | | | | | | | |
|---|---|---|---|---|---|---|---|---|---|---|---|---|
| 13 | −0.001 | −0.002 | −0.002 | −0.003 | −0.004 | −0.005 | −0.006 | −0.007 | −0.008 | −0.009 | −0.010 | −0.011 | −0.012 |
| 14 | −0.001 | −0.001 | −0.002 | −0.003 | −0.004 | −0.005 | −0.006 | −0.007 | −0.008 | −0.009 | −0.010 | −0.011 | −0.012 |
| 15 | −0.001 | −0.001 | −0.002 | −0.003 | −0.004 | −0.005 | −0.005 | −0.006 | −0.007 | −0.008 | −0.009 | −0.010 | −0.011 |
| 16 | −0.001 | −0.001 | −0.002 | −0.003 | −0.004 | −0.005 | −0.005 | −0.006 | −0.007 | −0.008 | −0.009 | −0.010 | −0.011 |
| 17 | −0.001 | −0.002 | −0.004 | −0.005 | −0.006 | −0.007 | −0.009 | −0.010 | −0.012 | −0.013 | −0.014 | −0.016 | −0.018 |
| 18 | −0.001 | −0.002 | −0.004 | −0.005 | −0.006 | −0.007 | −0.009 | −0.010 | −0.012 | −0.013 | −0.015 | −0.016 | −0.018 |
| 19 | −0.001 | −0.002 | −0.003 | −0.004 | −0.005 | −0.006 | −0.007 | −0.008 | −0.009 | −0.010 | −0.012 | −0.013 | −0.014 |
| 20 | −0.001 | −0.002 | −0.003 | −0.004 | −0.005 | −0.006 | −0.007 | −0.008 | −0.009 | −0.010 | −0.012 | −0.013 | −0.014 |

Frequency (GHz)

| Sample No. | 14.0 | 15.0 | 16.0 | 17.0 | 18.0 | 19.0 | 20.0 | 21 | 22 | 23 | 24 | 25 | 26 |
|---|---|---|---|---|---|---|---|---|---|---|---|---|---|
| 1 | −0.009 | −0.010 | −0.011 | −0.012 | −0.013 | −0.014 | −0.014 | −0.015 | −0.016 | −0.017 | −0.018 | −0.019 | −0.020 |
| 2 | −0.012 | −0.013 | −0.014 | −0.015 | −0.016 | −0.017 | −0.018 | −0.020 | −0.021 | −0.022 | −0.023 | −0.024 | −0.025 |
| 3 | −0.020 | −0.022 | −0.024 | −0.026 | −0.028 | −0.030 | −0.032 | −0.034 | −0.037 | −0.039 | −0.041 | −0.043 | −0.046 |
| 4 | −0.020 | −0.022 | −0.024 | −0.026 | −0.028 | −0.030 | −0.032 | −0.034 | −0.036 | −0.038 | −0.041 | −0.043 | −0.045 |
| 5 | −0.020 | −0.022 | −0.024 | −0.025 | −0.027 | −0.029 | −0.031 | −0.033 | −0.035 | −0.037 | −0.039 | −0.041 | −0.043 |
| 6 | −0.020 | −0.021 | −0.023 | −0.025 | −0.027 | −0.028 | −0.030 | −0.032 | −0.034 | −0.036 | −0.038 | −0.040 | −0.042 |
| 7 | −0.031 | −0.033 | −0.036 | −0.038 | −0.041 | −0.044 | −0.047 | −0.049 | −0.052 | −0.055 | −0.058 | −0.061 | −0.064 |
| 8 | −0.025 | −0.028 | −0.030 | −0.032 | −0.034 | −0.037 | −0.039 | −0.041 | −0.044 | −0.046 | −0.049 | −0.052 | −0.054 |
| 9 | −0.031 | −0.033 | −0.036 | −0.038 | −0.041 | −0.044 | −0.047 | −0.049 | −0.052 | −0.055 | −0.058 | −0.061 | −0.064 |
| 10 | −0.025 | −0.028 | −0.030 | −0.032 | −0.034 | −0.037 | −0.039 | −0.041 | −0.044 | −0.046 | −0.049 | −0.052 | −0.054 |
| 11 | −0.008 | −0.008 | −0.009 | −0.009 | −0.010 | −0.011 | −0.011 | −0.012 | −0.013 | −0.013 | −0.014 | −0.015 | −0.016 |
| 12 | −0.008 | −0.008 | −0.009 | −0.009 | −0.010 | −0.011 | −0.011 | −0.012 | −0.013 | −0.013 | −0.014 | −0.015 | −0.016 |
| 13 | −0.013 | −0.014 | −0.015 | −0.017 | −0.018 | −0.019 | −0.020 | −0.022 | −0.023 | −0.024 | −0.026 | −0.027 | −0.029 |
| 14 | −0.013 | −0.014 | −0.015 | −0.017 | −0.018 | −0.019 | −0.020 | −0.022 | −0.023 | −0.024 | −0.026 | −0.027 | −0.029 |
| 15 | −0.011 | −0.012 | −0.013 | −0.014 | −0.015 | −0.016 | −0.017 | −0.018 | −0.019 | −0.020 | −0.021 | −0.022 | −0.023 |
| 16 | −0.011 | −0.012 | −0.013 | −0.014 | −0.015 | −0.016 | −0.017 | −0.018 | −0.019 | −0.020 | −0.021 | −0.022 | −0.023 |
| 17 | −0.019 | −0.021 | −0.022 | −0.024 | −0.026 | −0.027 | −0.029 | −0.031 | −0.033 | −0.035 | −0.037 | −0.039 | −0.041 |
| 18 | −0.019 | −0.021 | −0.023 | −0.024 | −0.026 | −0.028 | −0.030 | −0.031 | −0.033 | −0.035 | −0.037 | −0.039 | −0.041 |
| 19 | −0.016 | −0.017 | −0.019 | −0.020 | −0.022 | −0.023 | −0.025 | −0.026 | −0.028 | −0.030 | −0.032 | −0.033 | −0.035 |
| 20 | −0.016 | −0.017 | −0.018 | −0.020 | −0.021 | −0.023 | −0.025 | −0.026 | −0.028 | −0.030 | −0.031 | −0.033 | −0.035 |

Frequency (GHz)

| Sample No. | 27 | 28 | 29 | 30 | 31 | 32 | 33 | 34 | 35 | 36 | 37 | 38 | 39 |
|---|---|---|---|---|---|---|---|---|---|---|---|---|---|
| 1 | −0.021 | −0.022 | −0.023 | −0.025 | −0.026 | −0.027 | −0.028 | −0.029 | −0.030 | −0.032 | −0.033 | −0.034 | −0.035 |
| 2 | −0.027 | −0.028 | −0.029 | −0.030 | −0.032 | −0.033 | −0.034 | −0.036 | −0.037 | −0.038 | −0.040 | −0.041 | −0.043 |
| 3 | −0.048 | −0.051 | −0.053 | −0.056 | −0.059 | −0.061 | −0.064 | −0.067 | −0.070 | −0.073 | −0.075 | −0.078 | −0.081 |
| 4 | −0.048 | −0.050 | −0.053 | −0.055 | −0.058 | −0.060 | −0.063 | −0.066 | −0.069 | −0.072 | −0.074 | −0.077 | −0.080 |
| 5 | −0.045 | −0.047 | −0.049 | −0.051 | −0.053 | −0.056 | −0.058 | −0.060 | −0.062 | −0.065 | −0.067 | −0.069 | −0.072 |
| 6 | −0.044 | −0.046 | −0.048 | −0.050 | −0.052 | −0.054 | −0.056 | −0.058 | −0.061 | −0.063 | −0.065 | −0.068 | −0.070 |
| 7 | −0.067 | −0.070 | −0.073 | −0.077 | −0.080 | −0.083 | −0.087 | −0.090 | −0.093 | −0.097 | −0.100 | −0.104 | −0.107 |
| 8 | −0.057 | −0.060 | −0.062 | −0.065 | −0.068 | −0.071 | −0.074 | −0.077 | −0.080 | −0.083 | −0.086 | −0.089 | −0.092 |
| 9 | −0.067 | −0.070 | −0.073 | −0.077 | −0.080 | −0.083 | −0.086 | −0.090 | −0.093 | −0.097 | −0.100 | −0.104 | −0.107 |
| 10 | −0.057 | −0.060 | −0.062 | −0.065 | −0.068 | −0.071 | −0.074 | −0.077 | −0.080 | −0.083 | −0.086 | −0.089 | −0.092 |
| 11 | −0.016 | −0.017 | −0.018 | −0.018 | −0.019 | −0.020 | −0.021 | −0.022 | −0.022 | −0.023 | −0.024 | −0.025 | −0.026 |
| 12 | −0.016 | −0.017 | −0.018 | −0.018 | −0.019 | −0.020 | −0.021 | −0.022 | −0.022 | −0.023 | −0.024 | −0.025 | −0.026 |
| 13 | −0.030 | −0.032 | −0.033 | −0.035 | −0.037 | −0.038 | −0.040 | −0.042 | −0.043 | −0.045 | −0.047 | −0.049 | −0.051 |
| 14 | −0.030 | −0.032 | −0.033 | −0.035 | −0.036 | −0.038 | −0.040 | −0.041 | −0.043 | −0.045 | −0.047 | −0.049 | −0.050 |
| 15 | −0.024 | −0.025 | −0.026 | −0.027 | −0.028 | −0.029 | −0.030 | −0.031 | −0.033 | −0.034 | −0.035 | −0.036 | −0.037 |
| 16 | −0.024 | −0.025 | −0.026 | −0.027 | −0.028 | −0.029 | −0.030 | −0.031 | −0.033 | −0.034 | −0.035 | −0.036 | −0.037 |
| 17 | −0.043 | −0.045 | −0.047 | −0.049 | −0.051 | −0.053 | −0.055 | −0.057 | −0.060 | −0.062 | −0.064 | −0.067 | −0.069 |
| 18 | −0.043 | −0.045 | −0.047 | −0.049 | −0.051 | −0.054 | −0.056 | −0.058 | −0.060 | −0.063 | −0.065 | −0.067 | −0.070 |
| 19 | −0.037 | −0.039 | −0.041 | −0.043 | −0.045 | −0.047 | −0.049 | −0.051 | −0.054 | −0.056 | −0.058 | −0.060 | −0.063 |
| 20 | −0.037 | −0.039 | −0.041 | −0.043 | −0.045 | −0.047 | −0.049 | −0.051 | −0.053 | −0.055 | −0.057 | −0.060 | −0.062 |

Frequency (GHz)

| Sample No. | 40 | 41 | 42 | 43 | 44 | 45 | 46 | 47 | 48 | 49 | 50 |
|---|---|---|---|---|---|---|---|---|---|---|---|
| 1 | −0.037 | −0.038 | −0.039 | −0.041 | −0.042 | −0.043 | −0.045 | −0.046 | −0.047 | −0.049 | −0.050 |
| 2 | −0.044 | −0.046 | −0.047 | −0.049 | −0.050 | −0.052 | −0.055 | −0.057 | −0.058 | −0.060 | −0.060 |
| 3 | −0.084 | −0.088 | −0.091 | −0.094 | −0.097 | −0.100 | −0.104 | −0.107 | −0.111 | −0.114 | −0.118 |
| 4 | −0.083 | −0.087 | −0.090 | −0.093 | −0.096 | −0.099 | −0.103 | −0.106 | −0.109 | −0.113 | −0.116 |
| 5 | −0.074 | −0.077 | −0.079 | −0.082 | −0.084 | −0.087 | −0.090 | −0.092 | −0.095 | −0.098 | −0.100 |
| 6 | −0.072 | −0.075 | −0.077 | −0.080 | −0.082 | −0.085 | −0.087 | −0.090 | −0.093 | −0.095 | −0.098 |
| 7 | −0.111 | −0.115 | −0.119 | −0.122 | −0.126 | −0.130 | −0.134 | −0.138 | −0.142 | −0.146 | −0.150 |
| 8 | −0.095 | −0.098 | −0.102 | −0.105 | −0.108 | −0.112 | −0.115 | −0.119 | −0.122 | −0.126 | −0.129 |
| 9 | −0.111 | −0.115 | −0.118 | −0.122 | −0.126 | −0.130 | −0.134 | −0.137 | −0.141 | −0.145 | −0.149 |
| 10 | −0.095 | −0.098 | −0.102 | −0.105 | −0.108 | −0.112 | −0.115 | −0.119 | −0.122 | −0.126 | −0.129 |
| 11 | −0.027 | −0.027 | −0.028 | −0.029 | −0.030 | −0.031 | −0.032 | −0.033 | −0.034 | −0.035 | −0.036 |
| 12 | −0.027 | −0.027 | −0.028 | −0.029 | −0.030 | −0.031 | −0.032 | −0.033 | −0.034 | −0.035 | −0.036 |
| 13 | −0.052 | −0.054 | −0.056 | −0.058 | −0.060 | −0.062 | −0.064 | −0.066 | −0.068 | −0.070 | −0.073 |
| 14 | −0.052 | −0.054 | −0.056 | −0.058 | −0.060 | −0.062 | −0.064 | −0.066 | −0.068 | −0.070 | −0.072 |
| 15 | −0.038 | −0.039 | −0.041 | −0.042 | −0.043 | −0.044 | −0.046 | −0.047 | −0.048 | −0.049 | −0.051 |

TABLE 4-continued

| | | | | | Insertion Loss (dB) | | | | | | |
|---|---|---|---|---|---|---|---|---|---|---|---|
| 16 | −0.038 | −0.039 | −0.041 | −0.042 | −0.043 | −0.044 | −0.046 | −0.047 | −0.048 | −0.049 | −0.051 |
| 17 | −0.071 | −0.074 | −0.076 | −0.079 | −0.081 | −0.084 | −0.086 | −0.089 | −0.092 | −0.094 | −0.097 |
| 18 | −0.072 | −0.075 | −0.077 | −0.080 | −0.082 | −0.085 | −0.087 | −0.090 | −0.092 | −0.095 | −0.098 |
| 19 | −0.065 | −0.067 | −0.070 | −0.072 | −0.075 | −0.077 | −0.080 | −0.082 | −0.085 | −0.088 | −0.091 |
| 20 | −0.064 | −0.067 | −0.069 | −0.071 | −0.074 | −0.076 | −0.079 | −0.081 | −0.084 | −0.087 | −0.089 |

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above compositions and products without departing from the scope of the disclosure, it is intended that all matter contained in the above description shall be interpreted as illustrative and not in a limiting sense.

What is claimed is:

1. An electrically conductive adhesive comprising an organic polymer resin and greater than 2% (by weight of the adhesive) to about 10% (by weight of the adhesive) of an electrically conductive polymer, wherein the electrically conductive adhesive has an electrical resistance of from about $10^4$ ohms to less than $10^9$ ohms.

2. The adhesive of claim 1 wherein the organic polymer resin is selected from the group consisting of epoxy, polyurethane, silicone, acrylic, polycyanate ester, and combinations thereof.

3. The adhesive of claim 1 wherein the adhesive comprises from about 90% (by weight of the adhesive) to about 98% (by weight of the adhesive) of the organic polymer resin.

4. The adhesive of claim 1 wherein the electrically conductive polymer is selected from the group consisting of polyaniline, polythiophene, polypyrrole, polyacetylene, polyphenylene sulfide, and combinations thereof.

5. The adhesive of claim 4 wherein the polyaniline is a doped polyaniline selected from the group consisting of polyaniline-dodecyl benzene sulfonic acid, polyaniline-camphor sulfonic acid, polyaniline-dinonylnaphthalene sulfonic acid, polyaniline-hydrochloric acid, polyaniline-sulfuric acid, and combinations thereof.

6. The adhesive of claim 1 wherein the adhesive has a viscosity of at least about 2,000 centipoise prior to curing.

7. The adhesive of claim 1 wherein the adhesive is a solid film prior to curing.

8. The adhesive of claim 1 wherein the adhesive has a solids content of at least about 98% (by weight of the adhesive) after curing.

9. The adhesive of claim 1 wherein the adhesive has a solids content of 100% (by weight of the adhesive) after curing.

10. The adhesive of claim 1 wherein the adhesive has a bond strength of from about 100 psi to about 5,000 psi after curing.

11. The adhesive of claim 1 wherein the adhesive is selected from the group consisting of a liquid, a paste, and a film.

12. An electrically conductive adhesive comprising an organic polymer resin and greater than 4% (by weight of the adhesive) to about 10% (by weight of the adhesive) of an electrically conductive polymer, wherein the electrically conductive adhesive has an electrical resistance of from about $10^4$ ohms to less than $10^9$ ohms.

13. The adhesive of claim 12 wherein the organic polymer resin is selected from the group consisting of epoxy, polyurethane, silicone, acrylic, polycyanate ester, and combinations thereof.

14. The adhesive of claim 12 wherein the electrically conductive polymer is selected from the group consisting of polyaniline, polythiophene, polypyrrole, polyacetylene, polyphenylene sulfide, and combinations thereof.

15. The adhesive of claim 14 wherein the polyaniline is a doped polyaniline selected from the group consisting of polyaniline-dodecyl benzene sulfonic acid, polyaniline-camphor sulfonic acid, polyaniline-dinonylnaphthalene sulfonic acid, polyaniline-hydrochloric acid, polyaniline-sulfuric acid, and combinations thereof.

16. A method of grounding a device using an electrically conductive adhesive, the method comprising:
   providing a device comprising floating metal or electronic components; and
   electrically connecting the floating metal or electronic components to a grounding point by applying the adhesive to at least a portion of each component;
   wherein the adhesive comprises an organic polymer resin and an electrically conductive polymer, and has an electrical resistance of from about $10^4$ ohms to less than $10^9$ ohms, and wherein said adhesive comprises greater than 2% by weight of the adhesive to about 10% by weight of the electrically conductive polymer.

17. The method of claim 16 wherein the adhesive comprises greater than 4% (by weight of the adhesive) to about 10% (by weight of the adhesive) of the electrically conductive polymer.

18. The method of claim 16 wherein the adhesive has a viscosity of at least about 2,000 centipoise prior to curing.

19. The method of claim 16 wherein the device is a space radar antenna.

* * * * *